United States Patent
Vogel

(10) Patent No.: US 11,559,843 B2
(45) Date of Patent: Jan. 24, 2023

(54) METHOD AND GRINDING MACHINE FOR GRINDING A GEAR WHEEL WORKPIECE

(71) Applicant: Klingelnberg GmbH, Hückeswagen (DE)

(72) Inventor: Olaf Vogel, Ettlingen (DE)

(73) Assignee: KLINGELNBERG GMBH

(*) Notice: Subject to any disclaimer, the term of this patent is extended or adjusted under 35 U.S.C. 154(b) by 841 days.

(21) Appl. No.: 16/382,837

(22) Filed: Apr. 12, 2019

(65) Prior Publication Data
US 2019/0314913 A1 Oct. 17, 2019

(30) Foreign Application Priority Data

Apr. 17, 2018 (DE) .......................... 102018109067.6

(51) Int. Cl.
*B23F 21/02* (2006.01)
*B23F 23/08* (2006.01)
(Continued)

(52) U.S. Cl.
CPC .......... *B23F 21/026* (2013.01); *B23F 23/085* (2013.01); *B24B 53/062* (2013.01); *B24B 53/075* (2013.01)

(58) Field of Classification Search
CPC .. B23F 21/026; B23F 23/085; B23F 23/1225; B23F 23/006; B23F 23/1218;
(Continued)

(56) References Cited

U.S. PATENT DOCUMENTS 10,773,356 B2 * 9/2020 Wuerfel ............. G05B 19/0426
2005/0266774 A1 * 12/2005 Baldeck ............... G05B 19/186
451/11
(Continued)

FOREIGN PATENT DOCUMENTS

CN 1727102 A 2/2006
CN 107552894 A 1/2018
(Continued)

OTHER PUBLICATIONS

European Search Report for European Patent Application No. EP 19166536.3, dated Sep. 24, 2019, 5 pages.
(Continued)

*Primary Examiner* — Joel D Crandall
*Assistant Examiner* — Michael A Gump
(74) *Attorney, Agent, or Firm* — McCarter & English, LLP

(57) ABSTRACT

Method for the grinding of a gear wheel workpiece using a dressable worm grinding wheel, wherein the worm grinding wheel is rotationally driven about a tool axis of rotation and the gear wheel workpiece is rotationally driven about a workpiece axis of rotation, and relative movements are executed between the worm grinding wheel and gear wheel workpiece, and wherein after the execution of a dressing procedure of the worm grinding wheel, which is carried out by means of a rotationally-drivable dressing unit, the following steps are carried out:
executing a relative shift movement between the worm grinding wheel and gear wheel workpiece parallel to the tool axis of rotation,
executing an axially-parallel relative movement between the worm grinding wheel and gear wheel workpiece in parallel or diagonally to the workpiece axis of rotation,
(Continued)

wherein a ratio between the shift movement and axially-parallel relative movement is specified, which is variable.

18 Claims, 5 Drawing Sheets

(51) Int. Cl.
*B24B 53/06* (2006.01)
*B24B 53/075* (2006.01)

(58) Field of Classification Search
CPC .... B23F 1/023; B23F 1/02; B23F 5/04; B24B 53/062; B24B 53/075; B24B 53/00; B24B 53/005; B24B 53/04; B24B 53/053; B24B 53/06; B24B 53/083; B24B 53/085; B24B 1/00; B24B 19/00; B24B 51/00; B24B 49/00; B24B 49/02; B24B 49/03; B24B 49/12; B24B 49/18–186; B24B 5/00; B24B 5/04; B24B 5/045; B24B 5/047; B24B 23/02; B24B 23/028; B24B 47/18; B24B 47/25; G05B 19/186; G05B 2219/35035; G05B 2219/36198
USPC .................................. 451/47, 219, 253, 275
See application file for complete search history.

(56) References Cited

U.S. PATENT DOCUMENTS

| 2007/0275638 A1* | 11/2007 | Baldeck .............. B23F 5/08 451/11 |
| 2012/0258647 A1* | 10/2012 | Geiser ............. B23F 23/1225 451/72 |
| 2016/0214196 A1* | 7/2016 | Wuerfel ........... B23F 23/1225 |
| 2019/0388986 A1* | 12/2019 | Vogel .............. B23F 23/1225 |

FOREIGN PATENT DOCUMENTS

| DE | 102012017840 B3 * | 12/2013 | ............. B23F 1/023 |
| DE | 102012017840 B3 | 12/2013 | |
| DE | 112012006475 T5 | 3/2015 | |
| EP | 3242175 A2 | 11/2017 | |
| WO | 2007/139708 A2 | 12/2007 | |

OTHER PUBLICATIONS

Schriefer et al., Kontinuierliches Wälzschleifen von Verzahnungen. Continuous Generating Grinding of Gears. Reishauer AG, Wallisellen. pp. 341-342, Jun. 2008.

* cited by examiner

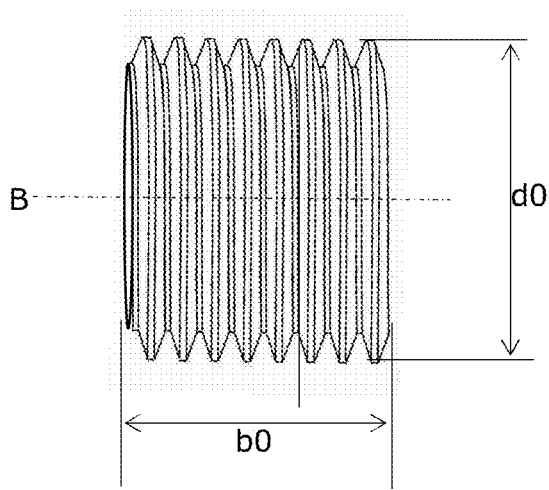
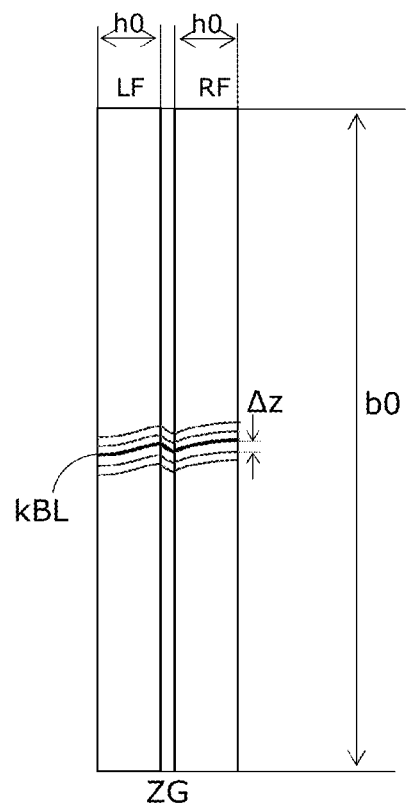
Fig. 3A
Fig. 3B

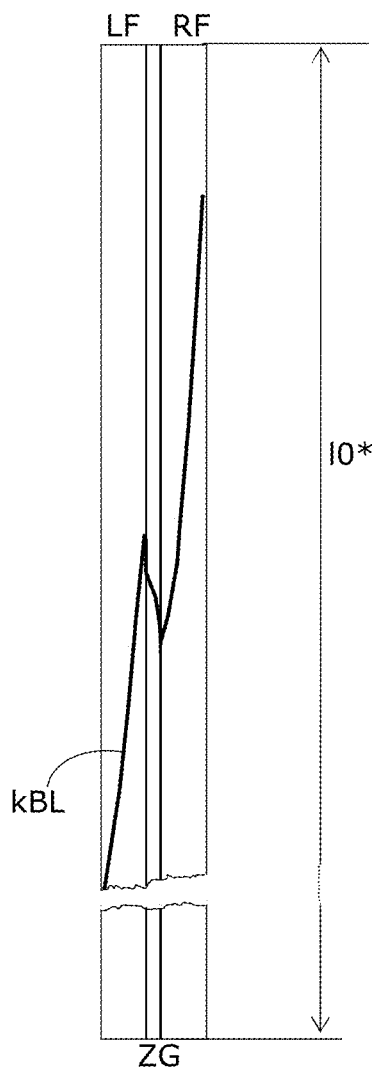
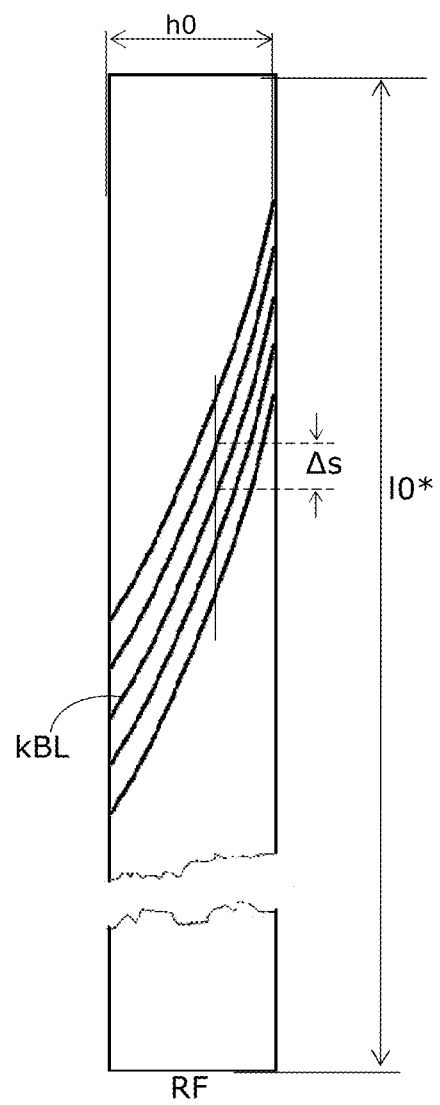
Fig. 3C                     Fig. 3D

METHOD AND GRINDING MACHINE FOR GRINDING A GEAR WHEEL WORKPIECE

CROSS-REFERENCE TO RELATED APPLICATIONS

This application claims the benefit under 35 U.S.C. § 119(e) to German patent application no. DE 102018109067.6 filed Apr. 17, 2018, which is hereby expressly incorporated by reference as part of the present disclosure.

FIELD OF THE INVENTION

The subject matter of the present disclosure relates to methods and devices for grinding of a gear wheel workpiece, for example with a worm grinding wheel which is dressable multiple times, and grinding machines having a controller for grinding of a gear wheel workpiece.

BACKGROUND

The elements of an exemplary known grinding machine 100 are shown in FIG. 1, wherein only the essential elements are identified in this illustration, specifically these are the tool spindle 1 including a grinding tool 2 and a workpiece spindle 3 having a workpiece W1. Moreover, some of the axes are shown in this illustration, which can be used for the grinding of the workpiece W1. These are the three linear axes X, Y, and Z. Moreover, there is an axis of rotation B, to be able to rotationally drive the grinding tool 2. The tool spindle 1 including the grinding tool 2 can be pivoted about a pivot axis A, to bring the pitch of the worm grinding wheel 2 into correspondence with the angle of inclination of the workpiece W1. Furthermore, there is an axis of rotation C (also called workpiece axis), to be able to rotationally drive the workpiece W1. It can be seen on the basis of FIG. 1 that an entire array of coordinated linear, rotational, and pivot movements are required to be able to perform grinding of a workpiece W1 using a grinding tool 2.

One of the factors which has an influence on the cost-effectiveness of such a grinding machine 100 is the service life of the grinding tool 2 (in the form of a worm grinding wheel here). The more rapidly the tool 2 wears out, the fewer workpieces W1 can be machined using a tool 2. There are therefore various strategies to use a worm grinding wheel 2 as cost-effectively as possible.

Inter alia, various shift strategies are used. Continuous shifting (sometimes also called diagonal shifting) is a procedure in which the grinding machine 100 executes a continuous shifting movement parallel to the Z axis to displace the worm grinding wheel 2 in relation to the workpiece W1. It is ensured by this form of shifting that regions having new and/or sufficiently cutting abrasive grains of the worm grinding wheel 2 are used. Not only the geometrical accuracy of the gear wheel workpieces W1 is ensured by the shifting, but rather also thermal damage on the tooth flanks can also be substantially prevented.

There are also non-continuous shift strategies, which are based, for example, on the worm grinding wheel 2 being divided into different regions for roughing and finishing of a workpiece W1.

There are also shift strategies in which shifting takes place in each case after the machining of a workpiece W1, for example, to be able to use another region of the worm grinding wheel 2 for machining the next workpiece.

Moreover, a grinding stroke is performed, which is necessary to be able to grind workpieces W1 over their entire tooth width b2. The grinding stroke comprises a linear movement of the worm grinding wheel 2 parallel to the X axis of the machine 100 in the case of a spur-toothed spur gear W1, as shown in FIG. 1.

The shift strategies for continuous shifting are typically defined according to the prior art by a ratio of the shift travel to the stroke travel. i.e., in conventional grinding, the absolute value of the continuous offset of the worm grinding wheel 2 is defined by the constant ratio of shift travel to stroke travel, wherein this definition can take place specifically by stroke. In these shift strategies, the shift travel is a length along the worm axis (referred to as the B axis here), i.e., along the worm width b0, and the stroke travel is a length along the workpiece axis (referred to as the C axis here).

Furthermore, an infeed movement is executed to cause a tooth of the worm grinding wheel 2 to penetrate up to a final depth into a tooth gap of the gear wheel workpiece W1. The infeed movement takes place in the example of FIG. 1 parallel to the Y axis of the machine 100.

SUMMARY

There is a need to further optimize the grinding using a worm grinding wheel.

It is therefore an object to develop a controller or software for a grinding machine for the grinding machining of gear wheels which has a reproducibly high precision of the grinding machining and nonetheless has a high efficiency. Moreover, a suitable method is to be provided, which contributes to improving the efficiency.

This relates to providing a grinding machine for the generating grinding of spur gears, which enables a uniformly high precision of the grinding machining of a series of workpieces.

According to at least some embodiments, a method for grinding of a gear wheel workpiece uses a dressable worm grinding wheel, which is rotationally driven about a tool axis of rotation, while the gear wheel workpiece is rotationally driven about a workpiece axis of rotation. Moreover, the worm grinding wheel executes grinding movements in relation to the gear wheel workpiece during the grinding. The worm grinding wheel is subjected to a dressing procedure from time to time or as needed. After the dressing procedure, which is used for dressing the worm grinding wheel, the following movements are carried out for the grinding of a gear wheel workpiece:

shifting the worm grinding wheel in relation to the gear wheel workpiece in parallel to the tool axis of rotation, axially-parallel relative movement parallel or diagonal to the workpiece axis of rotation, which may be perpendicular or diagonal to the tool axis of rotation, wherein a ratio between the shifting and the axially-parallel relative movement is specified, which is variable, so that during the grinding of a gear wheel workpiece after the dressing procedure, a different ratio is used than during the grinding of a gear wheel workpiece before the dressing procedure.

The change of the ratio can be performed before the dressing, during the dressing, or after the dressing, so that it is in effect during the grinding of the following gear wheel workpiece.

In at least a part of the embodiments, the grinding is performed in each case at constant ratio.

In at least a part of the embodiments, the word "variable" is used to specify that the mentioned ratio is not constant.

In at least a part of the embodiments, the word "variable" is used to specify that the mentioned ratio is adapted step-by-step, for example, in each case after each dressing of the worm grinding wheel.

At least a part of the embodiments involve a special form of shifting, which is executed during the grinding of multiple gear wheel workpieces after carrying out a dressing procedure.

In at least a part of the embodiments, a dressable worm grinding wheel is used which can be dressed multiple times, wherein the diameter of the worm grinding wheel is reduced by the dressing, and wherein the ratio between the shifting and the axially-parallel relative movement is changed as the diameter of the worm grinding wheel becomes smaller. I.e., in these embodiments a fixed ratio of shift travel to stroke travel is not used, but rather this ratio is intentionally adapted step-by-step. The term "stroke travel" is sometimes used here since it has become common in the technical literature. This means a relative movement between worm grinding wheel and gear wheel workpiece, which extends axially-parallel or diagonally to the workpiece axis of rotation. This axially-parallel relative movement can be generated, for example, by the activation of a single linear axis (sometimes also called stroke axis) or by the superposition of multiple movements in one machine.

In at least a part of the embodiments, the change of the ratio between the shifting and the axially-parallel relative movements is performed in parallel or diagonally to the workpiece axis of rotation on the basis of an engagement density, wherein the engagement density is a tool-specific variable. This change of the ratio is not performed continuously during the grinding, but rather discontinuously (in the meaning of step-by-step), for example, after each dressing procedure or after a number of dressing procedures.

In at least a part of the embodiments, the change of the ratio between the shifting and the axially-parallel relative movement is performed in parallel or diagonally to the workpiece axis of rotation on the basis of an engagement density, which is designed as a tool-specific variable, wherein the change of the ratio between the shifting and the axially-parallel relative movement is performed in such a way that the engagement density can be kept constant or approximately constant during the actual grinding of the gear wheel workpiece.

In at least a part of the embodiments, a grinding machine is used which comprises at least one spindle for accommodating and rotationally driving a worm grinding wheel, one spindle for accommodating and rotationally driving a gear wheel workpiece, and multiple NC-controlled axes, which are designed to execute relative movements of the worm grinding wheel in relation to the gear wheel workpiece for the purpose of the generating grinding. Furthermore, the grinding machine comprises a dressing device and a controller, which is connectable to the grinding machine in such a way that a procedure can be carried out after a dressing procedure, which comprises a relative, axially-parallel relative movement between worm grinding wheel and gear wheel workpiece, which extends axially-parallel or diagonally to the workpiece axis of rotation, and which comprises a relative shift movement between worm grinding wheel and gear wheel workpiece, wherein a ratio is predefinable between the shifting movement and the axially-parallel relative movement and is variable.

In at least a part of the embodiments, the controller is designed or programmable in such a way that it is capable of executing the steps of the method presented herein after each dressing procedure or after two or more than two dressing procedures.

The present teaching may be applied above all to spur-toothed spur gears and helical-toothed spur gears. The present teaching may be applied, for example, to beveloids (i.e., to gear wheels having conical gear teeth).

At least a part of the embodiments is oriented to the conditions or technological possibilities which have still proven to be reliable at the smallest diameter of the worm grinding wheel which has been dressed multiple times. I.e., one can proceed, for example, from a tool-specific performance variable which has proven itself in practice. This performance variable is a measure of the grinding capability of the worm grinding wheel when it has reached its minimum acceptable diameter because of dressing multiple times. Since one knows from experiential values that the worm grinding wheel still provides good and reliable grinding performance upon reaching its minimum acceptable diameter, an extrapolation for a changed shift strategy can be performed on the basis of this known grinding performance.

In at least a part of the embodiments, a measure of the grinding capability of the worm grinding wheel is used to adapt the ratio between a relative shift movement and the stroke movement (i.e., a relative axially-parallel movement parallel or diagonal to the workpiece axis of rotation) on the basis of this measure.

In at least a part of the embodiments, a ratio between the shifting and the axially-parallel relative movement is specified in parallel or diagonally to the workpiece axis of rotation and is variable.

To make this variability usable in a technologically reasonable manner, a process variable can be defined, which is referred to here by way of example as engagement density. In the corresponding embodiments, the shift strategy is adapted in dependence on the engagement density.

In at least a part of the embodiments, one proceeds from an engagement density as a measure for an upper limiting value which has proven itself during use of a worm grinding wheel having its minimum acceptable diameter. It is ensured by technical measures during the use of the worm grinding wheel that an effective engagement density, which is greater than the upper limiting value, cannot occur in any other region of the worm grinding wheel.

In at least a part of the embodiments, the grinding machine comprises a computer, or an interface for connection to an (external) computer, wherein the computer is designed to specify the ratio between the shift movement and the axially-parallel relative movement.

In at least a part of the embodiments, the grinding machine comprises a computer, or an interface for connection to an (external) computer, wherein the computer is designed, in a preparatory method step, to enable the determination of the profile of contact lines on tooth flanks of the worm grinding wheel, wherein the contact lines result during the grinding from a contact between the gear wheel workpiece and the worm grinding wheel, and wherein a mutual spacing between at least two adjacent contact lines is determinable, and to enable the computation of an engagement density as a number of contact points per unit of length therefrom.

In at least a part of the embodiments, an external computer, which can be connected, for example, via an internal or external network to an interface of the grinding machine, can be used, for example, to specify the ratio between the shift movement and the axially-parallel relative movement and/or to transfer corresponding specifications for the change of the ratio to the grinding machine by means of software or a software module.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, and are described in more detail below with reference to the drawings.

FIG. 3A shows a schematic side view of an exemplary worm grinding wheel, wherein further basic terms are defined on the basis of this view;

FIG. 3B shows a schematic projection of a tooth gap of a worm grinding wheel of FIG. 3A in an enlarged illustration, wherein multiple contact lines are shown which result when the worm grinding wheel is used for grinding a spur gear;

FIG. 3C shows a very schematic unwinding of a tooth gap of the worm grinding wheel of FIG. 3A in an enlarged illustration, wherein only one contact line is indicated in schematic form;

FIG. 3D shows a very schematic unwinding of a single worm flank of the worm grinding wheel of FIG. 3A in an enlarged illustration, wherein multiple contact lines are indicated in schematic form;

DETAILED DESCRIPTION

Terms, which are also used in relevant publications and patents, are used in conjunction with the present description. However, it is to be noted that the use of these terms is merely to serve for better comprehension. The inventive concepts and the scope of protection of the claims are not to be restricted in the interpretation by the specific selection of the terms. The disclosure may be readily transferred to other term systems and/or technical fields. The terms are to be applied accordingly in other technical fields.

Figure 1:
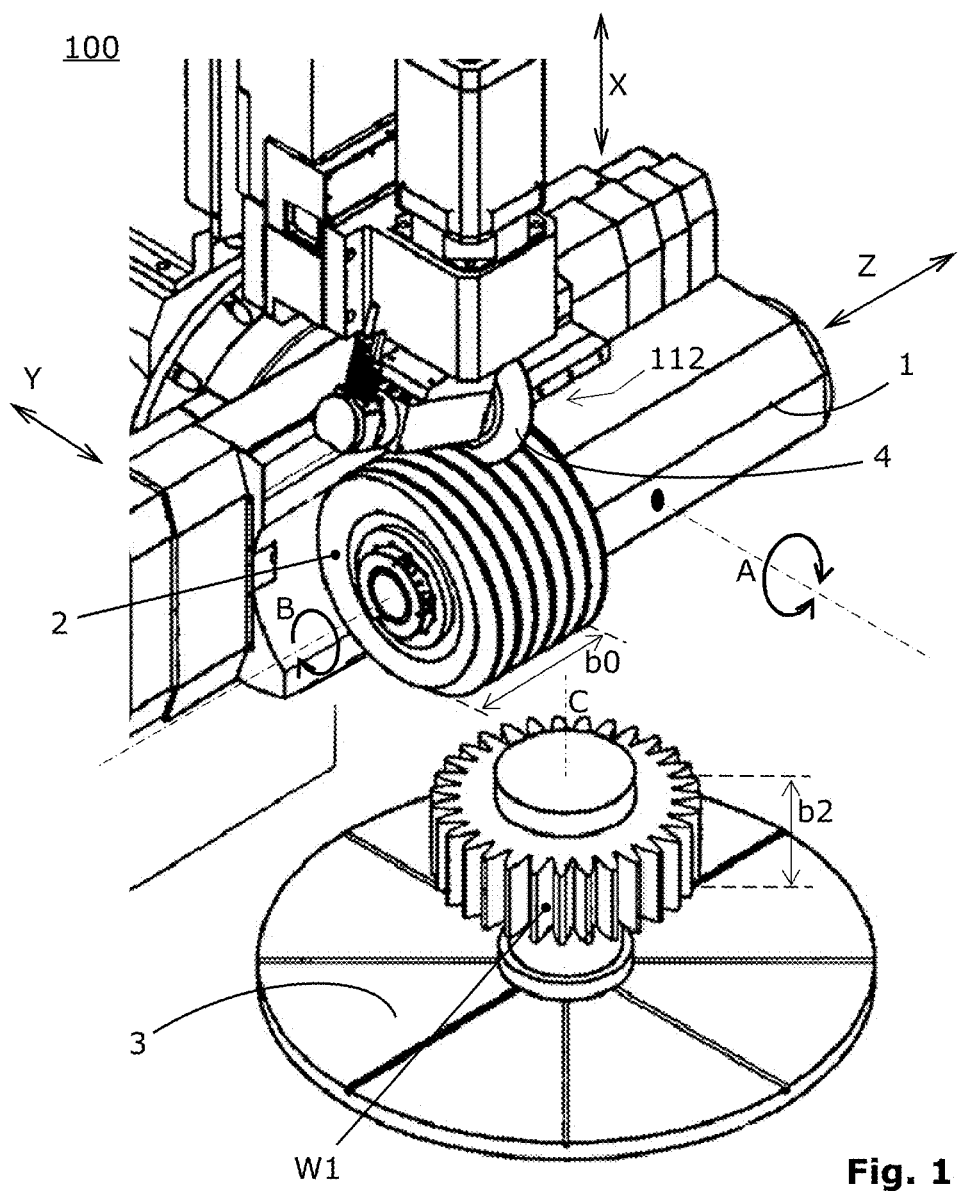
FIG. 1 shows a schematic perspective view of a known grinding machine which is designed to perform grinding machining of a workpiece using a grinding tool.
Figure 2A:
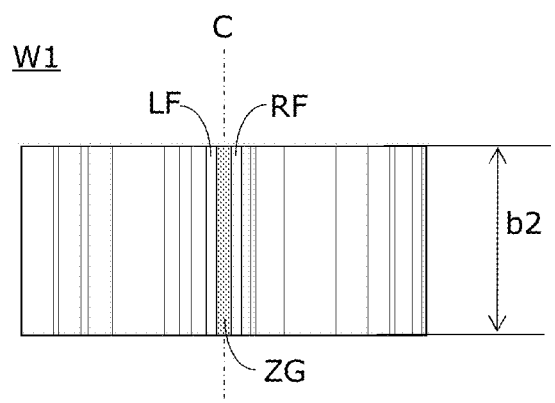
FIG. 2A shows a schematic side view of an exemplary spur-toothed spur gear, wherein basic terms are defined on the basis of this view.

FIG. 2A shows a schematic side view of an exemplary spur-toothed spur gear W1, wherein basic terms are defined on the basis of this view. The spur gear W1 has a tooth width b2 and is arranged so it is rotatable about the axis C. A tooth base ZG is shown gray in the middle of the illustration of FIG. 2A. The rectangular area which is located to the left of the tooth base ZG here represents a left tooth flank LF. The rectangular area which is located to the right of the tooth base ZG here, represents a right tooth flank RF.

Figure 2B:
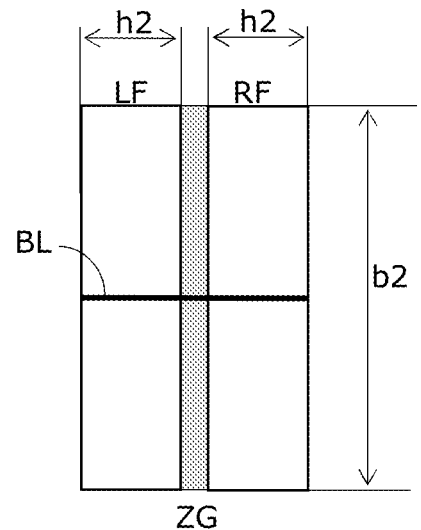
FIG. 2B shows a schematic projection of a tooth gap of the spur gear of FIG. 2A in an enlarged illustration, wherein a contact line is shown which results when a worm grinding wheel has been used for grinding the spur gear without stroke movement.

FIG. 2B shows a schematic projection of a single tooth gap 11 of the spur gear 2A in an enlarged illustration. In this schematic projection, each tooth flank was separately projected and the tooth base ZG, which is also shown gray here, was schematically supplemented. In this special form of the projection, the tooth height h2 of the teeth on the right and left of the tooth gap 11 is significantly greater than the gap width at the tooth base ZG. Moreover, the tooth flanks LF, RF and the tooth base ZG can be shown as rectangular areas in this projection. The tooth heads are each arranged on the right and left adjacent to the tooth flanks LF, RF (not shown in FIG. 2B).

If one were to machine by grinding the tooth gap 11 of the spur-toothed spur gear, for example, using a grinding wheel without stroke movement (i.e., without a relative movement axially-parallel to the workpiece axis of rotation C), a linear line train would thus result as the contact line BL. The contact line BL results in this case from the moving contact points when the grinding wheel rotates about the tool axis (of rotation) B. A linear line train only results, however, if there is no relative stroke movement parallel to the workpiece axis C, i.e., if the grinding wheel does not move in relation to the workpiece W1.

If a worm grinding wheel 2 is used, only a single contact line BL then also results, as shown in FIG. 2B, wherein this contact line BL is passed through multiple times during successive engagements of the worm grinding wheel 2, however.

The case shown in FIG. 2B is a special case, since for the grinding machining of the tooth flanks LF, RF along the entire tooth width b2, an axial feed parallel to the workpiece axis C is necessary. This axial feed is referred to here as a relative stroke movement and more generally also as a relative movement axially-parallel to the workpiece axis of rotation C.

Figure 2C:
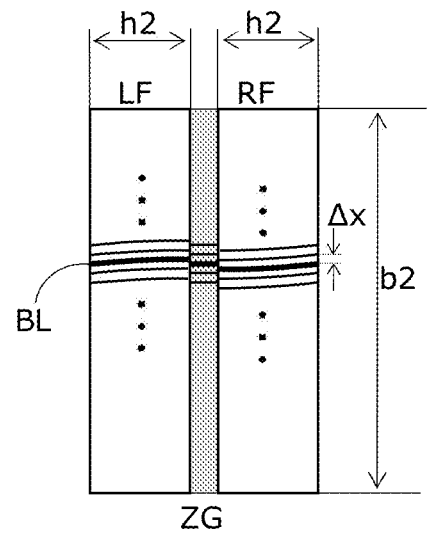
FIG. 2C shows a schematic projection of a tooth gap of the spur gear of FIG. 2A in an enlarged illustration, wherein multiple contact lines are shown which result when a worm grinding wheel is used for grinding the spur gear with stroke movement.

FIG. 2C shows a schematic projection of the same tooth gap 11 of the spur gear W1 of FIG. 2A in an enlarged illustration, wherein multiple contact lines BL are shown. These contact lines BL result when a worm grinding wheel 2 is used for grinding the spur gear W1, which executes a relative movement parallel to the workpiece axis C, to thus be able to machine by grinding the entire tooth width b2. Only five contact lines B1 are shown here, so as not to overload the illustration. In practice, contact lines BL result along the entire tooth width b2.

Since a relative movement parallel to the workpiece axis C is specified, the contact point travels in a plane along the flank surfaces LF, RF, but rather the contact lines BL extend more and more diagonally as the selected axial feed becomes greater. In the illustration of FIG. 2C, the present axial feed $\Delta x$ per workpiece revolution can be read off on the basis of the spacing of two adjacent contact lines BL, as indicated in FIG. 2C.

The illustrations of FIGS. 2A to 2C relate to a spur-toothed spur gear W1. If one observes the situation on a worm grinding wheel 2 which is used as a grinding tool, corresponding contact lines kBL can be defined thereon. However, these corresponding contact lines kBL have a significantly different shape. In the definition of the corresponding contact lines kBL, the assumption is made here that a worm grinding wheel 2 as a worm mathematically corresponds to helical gear teeth having large angle of inclination (close to 90°) or small lead angle (close to 0°), respectively. An exemplary worm grinding wheel 2 is shown in a side view in FIG. 3A. The worm grinding wheel 2 has a width b0 and a diameter d0. The tool axis (of rotation) is provided with the reference sign B.

FIG. 3B shows a projection of a tooth gap of the worm grinding wheel 2 in an enlarged illustration. This projection is equivalent in principle to the projection of FIGS. 2B and 2C, wherein the ratio of tooth width to tooth height is significantly greater, however. The depiction of FIG. 3B is not to scale. The two tooth flanks LF and RF, and also the tooth base ZG can again be recognized in this radial projection. The tooth flanks LF and RF and also the tooth heads (on the left and right adjacent to the tooth flanks LF and RF) are covered with abrasive grains, which cannot be seen here, however. The length of the tooth flanks LF and RF is referred to as worm width b0 and the height of the tooth flanks LF and RF is referred to as tooth height h0.

In the illustration of FIG. 3B, one can read off the present axial feed $\Delta z$ of the worm grinding wheel 2 per tool revolution (i.e., per revolution of the worm grinding wheel 2), on the basis of the spacing of two adjacent contact lines kBL. The axial feed $\Delta z$ corresponds to the shift travel per tool revolution.

Because of the large angle of inclination or the small pitch, the projection of FIG. 3B only shows a strongly distorted image of the flank areas actually usable for grinding. An unwinding of the worm flanks is therefore shown in a schematic, very simplified illustration in FIG. 3C.

The unwinding of the tooth flanks is obtained by observing, for example, the central cylinder of the worm grinding wheel 2. This central cylinder intersects the flank areas of the flanks LF, RF in a helical line (in a modified worm grinding wheel 2, it is generally only approximately a helical line). The length of this helical line results in each case as a quotient of the worm width b0 and the sine of the respective lead angle of the tooth flank LF, RF on the central cylinder (diameter of the cylinder). With growing diameter of the cylinder, the length of the helical line increases. I.e., the length of the helical line is greatest at the head cylinder. The difference between the length of the helical line at the tooth head and at the tooth base in relation to the helix length is small, since the tooth height h0 is relatively small in relation to the worm width b0.

A reference diameter having an associated reference helical line and a reference helix length l0* can be defined as follows:

$$l0*=b0/\sin(\gamma0*) \quad \text{[equation1]}.$$

$\gamma0*$ is the lead angle at the reference diameter of the worm grinding wheel 2. The stretched illustration of FIG. 3 results from this conversion, wherein in principle the illustration of FIG. 3B was stretched by the factor $1/\sin(\gamma0*)$. It is to be noted that the contact line kBL, which is shown in FIG. 3C, actually would still have to be stretched significantly more to correspond to reality. Moreover, only one contact line kBL is shown in FIG. 3C, although the entire flanks LF, RF would have to be covered with such contact lines kBL.

The unwinding of a single worm flank (the flank RF) is now shown in schematic form in FIG. 3D. Multiple contact lines kBL are shown offset in relation to one another here, which were selected as identical for the sake of simplicity. On the basis of the spacing of two adjacent contact lines kBL, one can read off the helix travel per tool revolution in FIG. 3D. This helix travel corresponds to the shift travel $\Delta s$ per tool revolution divided by the sine of the lead angle $\gamma0*$. The contact lines kBL which are shown in FIG. 3D are rolling lines on a rectangle having the side lengths h0 (tooth height) and l0* (reference helical line length). The spacing of the contact lines kBL in this unwinding corresponds to the helix travel per tool revolution around the tool axis (of rotation) B. This helix travel results according to above equation [1] from the shift travel $\Delta s$ per tool revolution.

It may now be derived that after a dressing procedure, by adapting the ratio between the shifting and the axially-parallel movement, a better use of the abrasive grains can be achieved. In at least a part of the embodiments, this ratio is therefore adapted after one dressing procedure or after multiple dressing procedures. In other words, during the grinding using a worm grinding wheel 2 having large diameter d1, a different ratio of the relative movement axially-parallel or diagonally to the workpiece axis of rotation C to the shift travel is used than during grinding using a worm grinding wheel 2, whose effective diameter d0 has become smaller due to the dressing.

The concept of the "engagement density EgD" is introduced hereafter. This engagement density EgD, which is observed along the helical lines or the tooth longitudinal direction, is defined as the reciprocal value to the helix travel per tool revolution. The following equation applies in conjunction with FIG. 3B:

$$EgD=(\Delta z/\sin \gamma0*)^{-1} \quad \text{[Equation 2]}$$

The following equation applies in conjunction with FIG. 3D:

$$EgD=\Delta s \cdot \sin \gamma0* \quad \text{[Equation 3]}$$

I.e., the engagement density EgD defines the number of the engagements per helix travel. The engagement density EgD is significantly less at the maximum worm grinding wheel diameter d0$max$ than at the minimum worm grinding wheel diameter d0$min$ (if the ratio of shift travel to axially-parallel movement is kept constant.

A quantitative statement becomes possible for the first time by the definition of the engagement density EgD. The grinding strategy can be adapted on the basis of this quantitative statement, to be able to use the worm grinding wheel 2 better. This in turn has the result that more workpieces W1 can be ground using a worm grinding wheel 2 than previously, wherein worsening of the surface quality of the ground tooth flanks is not caused by the application of the new grinding strategy (more precisely it is a handling strategy).

The application of the engagement density EgD to define a new handling strategy is explained hereafter on the basis of a numeric example.

By way of example, a constant stroke (i.e., a constant axially-parallel relative movement parallel or diagonally to the workpiece axis of rotation C) having an axial feed of 0.3 mm/workpiece revolution is presumed here by way of example (as heretofore in the prior art). Moreover, it is assumed that the worm grinding wheel 2 has a maximum diameter d0$max$=250 mm and a minimum diameter d0$min$=220 mm. Moreover, the worm grinding wheel 2 has a gear count of 5 and the workpiece W1 is a spur gear having a tooth count of 29.

The axial feed may be converted as follows to the tool revolution. The axial feed converted to the tool revolution corresponds to the stroke travel per tool revolution, i.e.:

$$\frac{0.3 \text{ mm} \cdot 5}{29} = 0.052 \text{ mm/tool\_revolution}$$

The shift travel per tool revolution corresponds to the shift travel per engagement of the worm tooth of the worm grinding wheel 2, as follows:

$$\frac{0.025 \text{ mm}}{\text{mm}} \cdot \frac{0.052 \text{ mm}}{\text{tool}_{revolution}} = 1.3 \text{ µm/tool\_revolution}$$

The number of the engagements per shift travel in the axial direction can be computed therefrom, and 769 interventions per millimeter of worm width result.

These variables are all independent of the effective diameter d0 of the worm grinding wheel 2. In contrast, if one observes the (flank) surface covered with abrasive grains along the worm width b0, the lead angle plays a role. At the diameter $d0max$=350 mm, the lead angle is only 2.05°. At the diameter $d0min$=220 mm, in contrast, the lead angle is 3.26°.

The helix travel per tool revolution corresponds to the travel along the flank surface. In a worm grinding wheel 2 having the diameter $d0max$, the helix travel per tool revolution is determined as follows from equation 2:

$$\left(\frac{1.3 \text{ µm}}{\text{tool\_revolution}}\right) / \sin(2.05°) = 36.3 \text{ µm/tool\_revolution}$$

In a worm grinding wheel 2 having the diameter $d0min$, the helix travel per tool revolution is determined as follows from equation 2:

$$\left(\frac{1.3 \text{ µm}}{\text{tool}_{revolution}}\right) / \sin(3.26°) = 22.9 \text{ µm/tool\_revolution}$$

The helix travel per tool revolution is thus significantly less in a worm grinding wheel 2 having small diameter than in a worm grinding wheel 2 having large diameter. The helix travel thus changes due to the diameter changing by way of dressing.

The number of the engagements per helix travel (this variable is referred to here by definition as engagement density EgD) is, with a worm grinding wheel 2 having the diameter $d0max$: EgD=27.5 interventions per mm (along the flank surface). The number of the interventions per helix travel is, with a worm grinding wheel 2 having the diameter $d0min$: EgD=43.7 interventions per mm (along the flank surface).

The engagement density EgD is significantly less at maximum diameter $d1max$ than at minimum diameter $d1min$, if the ratio of shift travel to axially-parallel movement is kept constant.

A definition of a novel grinding or handling strategy can now be performed in at least a part of the embodiments on the basis of the following approach. If the worm grinding wheel 2 was developed so that it still operates reliably even upon reaching the minimum diameter $d0min$ and supplies good grinding results, proceeding from the engagement density EgD=43.7 interventions per mm, a suitable adaptation of the grinding or handling strategy can be performed as follows.

A new helix travel per tool revolution can be determined as follows in reverse on the basis of equation 2:

$$\frac{36.3 \text{ µm}}{22.9 \text{ µm}} = 1.58 \Rightarrow \frac{1.3 \text{ µm}}{1.58} = 0.82 \text{ µm}$$

I.e., the helix travel per tool revolution can be reduced from 1.3 µm to 0.82 µm. A helix travel of 0.82 µm per tool revolution then corresponds to an engagement density per shift travel (instead of an engagement density EgD per helix travel) of 1222 interventions per mm (along the worm width). A shift travel per stroke travel of 0.016 mm/mm may be computed therefrom (in general this ratio is also referred to here as the ratio of the shift travel to the axially-parallel movement parallel or diagonal to the workpiece axis of rotation C). This corresponds to a savings of 36% for the required shift travel for the observed stroke. This observation is independent of the specific axial feed and thus applies for finishing and roughing strokes.

An exemplary novel grinding or handling strategy can now appear as follows, for example. Upon reaching the minimum diameter $d0min$, for example, a shift travel per stroke travel of 0.025 mm/mm can be specified. When grinding using a worm grinding wheel 2, the diameter of which corresponds to the maximum diameter $d0max$, for example, a shift travel per stroke travel of 0.06 mm/mm can be specified. The grinding using a new (not yet dressed or only slightly dressed worm grinding wheel 2) begins with a ratio of shift travel to stroke travel of 0.016. If one presumes a linear relationship, the ratio of shift travel to stroke travel can then be changed after each dressing step-by-step linearly from 0.016 to 0.025.

This approach provides very good results, since more accurate studies have shown that the dependence of the engagement density EgD on the worm grinding wheel diameter d0 extends approximately linearly.

If one furthermore presumes that upon applying the conventional continuous shift strategy having constant ratio of shift travel to stroke travel, 28 workpieces W1 can be machined per dressing with approximately 270 possible dressing procedures, one could thus grind approximately 28*270=7560 workpieces W1 using one worm grinding wheel 2 using this conventional strategy.

With the new shift or handling strategy, which provides a variable ratio, instead of the 28 workpieces, approximately 43.5 workpieces can be manufactured at the maximum diameter $d0max$ before the first dressing. If one presumes a linear relationship, the number of the workpieces W1 manufacturable over the entire diameter range of the worm grinding wheel 2 may be estimated as follows:

$$\left(\frac{43+28}{2}\right) \cdot 270 = 9652 \text{ workpieces.}$$

9652 workpieces are approximately 28% more than 7560, which can be ground using the conventional, continuous shift strategy. I.e., the grinding method can be significantly optimized by the linear adaptation of the ratio of shift travel to stroke travel after each dressing.

The adaptation of the ratio of shift travel to axially-parallel relative movement can also be performed as a function of the effective diameter d0 of the worm grinding wheel 2. For this purpose, the diameter d0 can be determined in each case after the dressing, to specify the ratio of shift travel to axially-parallel movement for the grinding procedures which follow after the dressing in a computational manner using an equation.

Instead of the tooth height h0, for the computed approximation to the tooth flank surface, the scaled variable h0/cos (αn0) can also be used, wherein αn0 is the normal engagement angle. Since the engagement density EgD was observed in the above-described embodiments in the direction of the helix lines (tooth longitudinal direction) for the sake of simplicity (see also FIG. 3D), this was not necessary here.

A more accurate observation of the spacings between contact lines kBL can be performed, for example, by measuring or computing the spacing Δz not along the helix line (as shown in FIG. 3D), but rather perpendicularly to the contact lines kBL. For the determination of a corresponding engagement density along the perpendicular spacing between the contact lines kBL, the above-mentioned conversion using the normal engagement angle αn0 has to be performed. Furthermore, however, the actual inclination of the contact lines BL is also to be determined and taken into consideration.

In this way, one obtains a somewhat more accurate equation, which can be used in at least some embodiments after the dressing for adapting the ratio of shift travel to axially-parallel movement.

Instead of performing a linear adaptation of the ratio of shift travel to axially-parallel relative movement, this adaptation can also be performed nonlinearly in at least some embodiments after the dressing.

Instead of performing a linear adaptation of the ratio of shift travel to axially-parallel relative movement, this adaptation can also be performed in at least some embodiments after the dressing by reading out previously stored values from a database (for example, by a table lookup). In these embodiments, a step-by-step (regional) adaptation of the ratio of shift travel to axially-parallel relative movement is then applied.

A grinding machine 100 of at least some embodiments can be equipped, for example, with a tool spindle 1 for accommodating and rotationally driving a grinding tool 2 about a tool axis of rotation B (also referred to in short as tool axis). Furthermore, the grinding machine 100 can comprise, for example, a workpiece spindle 3 for accommodating a workpiece W1. Moreover, the machine 100 comprises a dressing device 112 having a dressing unit 4 and the machine 100 is designed so that a dressing procedure can be performed by means of the dressing tool 4 without re-chucking the grinding tool 2. The dressing of the grinding tool 2 using the dressing unit 4 is shown in a snapshot in FIG. 4.

Figure 4:
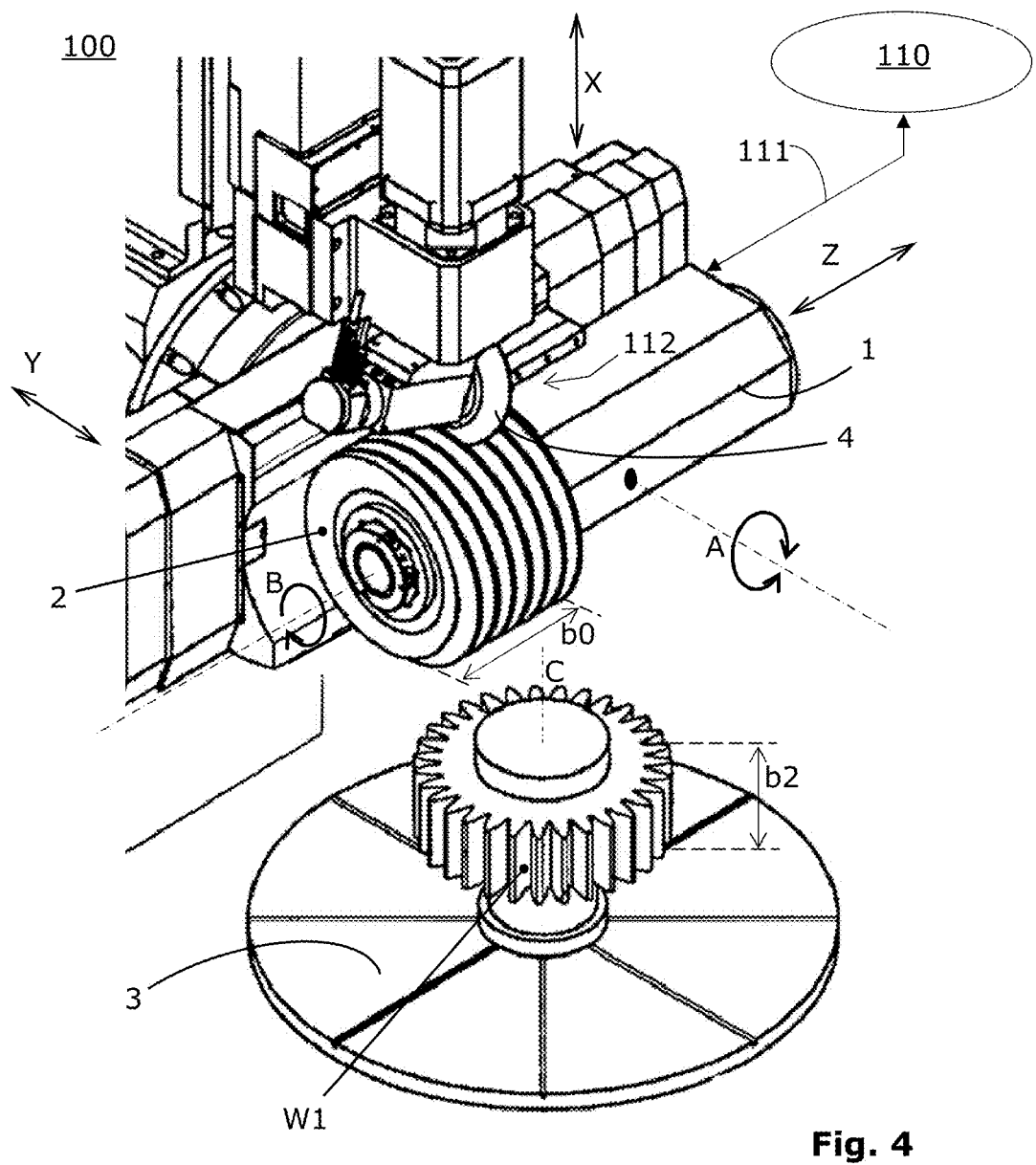
FIG. 4 shows a schematic perspective view of a grinding machine which is designed to perform grinding machining of a workpiece using a grinding tool.

Furthermore, the grinding machine 100 comprises a controller 110. In FIG. 4, this controller 110 is only indicated by an oval, which has a communication connection permanently or as needed to the grinding machine 100 and/or to the dressing device 112. The communication connection is provided with the reference sign 111.

In a part of the embodiments, controller 110 assumes the linear or nonlinear adaptation of the ratio of shift travel to stroke travel in each case after the dressing of the worm grinding wheel 2.

The arrangement and design of the axes of the grinding machine 100 are solely to be understood as examples. There are numerous other axis constellations which are also suitable. The relative movements which are described here also do not have to be executed by the movement of a single axis (for example, the stroke axis X). Each of the movements can also be generated by the superposition of two or more than two axial movements.

The adaptation of the mentioned ratio may be performed in at least some embodiments after each dressing of the worm grinding wheel 2. The adaptation of the mentioned ratio can also be performed, for example, only after every second dressing or at another interval.

The adaptation "after the dressing" also includes an adaptation which can take place only immediately before the further use of a previously dressed worm grinding wheel 2 for grinding.

The adaptation of the mentioned ratio can take place in small steps. If, for example, a total of 2000 workpieces W1 can be ground using a specific worm grinding wheel 2 and if the engagement density EgD is between 0.01 and 0.03, the difference between 0.03 and 0.01 can be divided by 2000. 2000 micro-steps, each of 0.00001 mm/mm are thus obtained. In this case, the controller 110 performs small changes of the ratio after each dressing procedure step-by-step.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising:
    grinding a gear wheel workpiece with a dressable worm grinding wheel, including:
        rotationally driving the worm grinding wheel about a tool axis of rotation,
        rotationally driving the gear wheel workpiece about a workpiece axis of rotation, and
        executing relative movements between the worm grinding wheel and the gear wheel workpiece;
    dressing the worm grinding wheel with a rotationally-drivable dressing tool;
    executing, after the dressing step:
        a relative shift movement between the worm grinding wheel and the gear wheel workpiece in parallel to the tool axis of rotation; and
        an axially relative movement between the worm grinding wheel and the gear wheel workpiece in parallel or diagonally to the workpiece axis of rotation; and
    defining a variable ratio between the shift movement and the axially relative movement, so that during subsequent grinding of the gear wheel workpiece a different ratio is used than during the said grinding step before the dressing step;
    the method further comprising changing the ratio between the shift movement and the axially relative movement based on tool-specific engagement density.

2. The method according to claim 1, wherein the dressing step further includes reducing a diameter of the worm grinding wheel.

3. The method according to claim 1, wherein the dressing step further includes reducing a diameter of the worm grinding wheel, and further including wherein changing the ratio includes increasing the ratio between the shift movement and the axially relative movement after the dressing step.

4. The method according to claim 1, further including:
determining a profile of contact lines on tooth flanks of the worm grinding wheel formed by contact between the worm grinding wheel and the gear wheel workpiece during grinding thereof;
determining a spacing between at least two adjacent of said contact lines; and
determining the engagement density using said spacing and defined as a number of contact points per unit of length.

5. The method according to claim 1, further including:
determining a profile of contact lines on tooth flanks of the worm grinding wheel formed by contact between the gear wheel workpiece and the worm grinding wheel during grinding thereof;
determining a spacing between at least two adjacent of said contact lines;
determining the engagement density using said spacing and defined as a number of contact points per unit of length; and
defining a grinding strategy for the grinding step using the engagement density.

6. The method according to claim 5, including performing the changing step so that the engagement density remains at least substantially constant, even when a diameter of the worm grinding wheel is reduced during the dressing step.

7. The method according to claim 5, wherein the engagement density is defined along helix lines of the worm grinding wheel or along a tooth longitudinal direction of the worm grinding wheel.

8. The method according to claim 5, wherein the engagement density is defined by a reciprocal value of a helix travel per tool revolution.

9. The method according to claim 1, further including:
determining a profile of contact lines on tooth flanks of the worm grinding wheel formed by contact between the worm grinding wheel and the gear wheel workpiece during grinding thereof;
determining a spacing between at least two adjacent of said contact lines;
determining the engagement density using said spacing and defined as a number of contact points per unit of length; and
defining the ratio between the shifting and the axially relative movement using said engagement density.

10. A grinding machine comprising:
a spindle configured to receive and rotationally drive a worm grinding wheel;
a spindle configured to receive and rotationally drive a gear wheel workpiece;
a dressing device configured to receive and rotationally drive a dressing tool;
a plurality of NC-controlled axes configured to execute relative movements between the worm grinding wheel and the gear wheel workpiece for grinding the gear wheel workpiece and to execute relative movements between the worm grinding wheel and the dressing tool for dressing the worm grinding wheel; and
a controller operatively connectable to the grinding machine for, after dressing the worm grinding wheel, execution of an axially relative movement between the worm grinding wheel and the gear wheel workpiece in parallel or diagonally to an axis of rotation of the workpiece and a relative shift movement between the worm grinding wheel and the gear wheel workpiece in parallel to an axis of rotation of the tool;
wherein the controller defines a variable ratio between the shift movement and the axially relative movement so that during grinding of the gear wheel workpiece after dressing of the worm grinding wheel, a different ratio is used than during grinding of the gear wheel workpiece before said dressing of the worm grinding wheel; and
wherein one or more of the grinding machine or the controller is configured to define the ratio between the shift movement and the axially relative movement using an engagement density.

11. The grinding machine according to claim 10, wherein one or more of the grinding machine or the controller is configured to determine a profile of contact lines on tooth flanks of the worm grinding wheel formed by contact between the worm grinding wheel and the gear wheel workpiece during grinding thereof, to determine spacing between at least two adjacent of said contact lines, and to determine the engagement density using said spacing and defined as a number of contact points per unit of length.

12. The grinding machine according to claim 11, wherein the engagement density is defined along helix lines of the worm grinding wheel or along a tooth longitudinal direction of the worm grinding wheel.

13. The grinding machine according to claim 11, wherein the engagement density is defined by a reciprocal value of a helix travel per tool revolution.

14. The grinding machine according to claim 10, wherein one or more of the grinding machine or the controller is configured to define a grinding strategy for grinding the gear wheel workpiece and to dress the worm grinding wheel using the engagement density and comprising defining the ratio.

15. The grinding machine according to claim 10, wherein the engagement density is defined along helix lines of the worm grinding wheel or along a tooth longitudinal direction of the worm grinding wheel.

16. The grinding machine according to claim 10, wherein the engagement density is defined by a reciprocal value of a helix travel per tool revolution.

17. The grinding machine according to claim 10, wherein the grinding machine further comprises a computer, wherein such computer includes the controller.

18. The grinding machine according to claim 10, wherein the grinding machine further comprises a computer, wherein the computer includes the controller, wherein such computer is configured to determine a profile of contact lines on tooth flanks of the worm grinding wheel formed by contact between the worm grinding wheel and the gear wheel workpiece during grinding thereof, to determine a spacing between at least two adjacent of said contact lines, and determine the engagement density using said spacing and defined as a number of contact points per unit of length.

* * * * *